United States Patent [19]

Clay

[11] Patent Number: 4,519,857
[45] Date of Patent: May 28, 1985

[54] ELASTIC BAND SEALER APPARATUS AND METHOD FOR FORMING A CONTINUOUS NON-OVERLAPPING BAND

[75] Inventor: Bobby J. Clay, Cincinnati, Ohio
[73] Assignee: Natmar, Inc., Cincinnati, Ohio
[21] Appl. No.: 538,817
[22] Filed: Oct. 5, 1983
[51] Int. Cl.³ .................... B29D 23/10; B65H 69/08
[52] U.S. Cl. ...................................... 156/64; 156/217; 156/304.1; 156/304.6; 156/378; 156/443; 156/502; 156/583.1
[58] Field of Search ............... 156/64, 73.4, 137, 159, 156/217, 304.1, 304.6, 378, 502, 503, 583.1, 443

[56] References Cited

U.S. PATENT DOCUMENTS

| | | | |
|---|---|---|---|
| 3,117,049 | 1/1964 | Otstot et al. | 156/503 |
| 3,993,522 | 11/1976 | Ballou | 156/304.6 |
| 4,012,277 | 3/1977 | Lundskow | 156/571 |
| 4,061,517 | 12/1977 | Dutton, III et al. | 156/304.6 |
| 4,207,135 | 6/1980 | Pavano | 156/159 |
| 4,426,241 | 1/1984 | Zimmermann et al. | 156/217 |

Primary Examiner—Michael Wityshyn
Attorney, Agent, or Firm—Frost & Jacobs

[57] ABSTRACT

An elastic band sealer for forming a continuous non-overlapping band from a source of material in which the band sealer includes apparatus to extend a length of material from the source, apparatus to cut the material into a strip after it is extended, and apparatus to fuse the strip into a continuous non-overlapping band. The band sealer can also include apparatus to measure the extended length of material such that it may be cut into discrete strips.

The apparatus for fusing the strip generally includes a heating head and additional apparatus which rotates the ends of the strip toward one another such that the heating head can fuse the strip into a continuous non-overlapping band.

A method of forming a continuous non-overlapping band from a source of material is also considered, which includes extending a length of the material from the source, cutting the material into a strip after it has been extended, and fusing the strip into a continuous non-overlapping band.

16 Claims, 5 Drawing Figures

ELASTIC BAND SEALER APPARATUS AND METHOD FOR FORMING A CONTINUOUS NON-OVERLAPPING BAND

BACKGROUND OF THE INVENTION (1) Field of the Invention

The present invention relates to an apparatus for forming a continuous non-overlapping band. The present invention also relates to a method for making a continuous non-overlapping band.

(2) Prior Art

Prior to the present invention, continuous elastic bands employed, for example, in the waist portion of underwear, wrist and head sweatbands, jockey straps and dust ruffles for beds are formed by overlapping the ends of a strip of elastic and sewing the elastic together forming a continuous band. As a result thereof, all continuous elastic bands had an area of overlap in which the band was thicker in the overlapped portion than the remaining portion of the band. For years, this overlapped portion was the portion of the band upon which the label was positioned in an attempt to make the overlapping portion a bit more smooth to the skin when the elastic band was employed in underwear, sweatbands or jockey straps. Nonetheless, the overlapped portion would continue to make the skin irritated and red, producing a tender spot.

When the elastic band is employed as a dust cover for a bed, the overlapped portion of the elastic strip produces a small area on the dust cover which bulges and protrudes farther than the remaining portions of the dust cover. Consequently, whenever the bed is covered with a decorative spread, the spread likewise bulges excessively in the overlapped portion of the elastic. Prior to the present invention, it was necessary to rotate the dust cover around the bed until it was located underneath the headboard, such that the decorative blanket or spead would not bulge noticeably.

The bulging and protrusion of the overlapped ends of the elastic strip were also noticable with jockey straps and underwear. Typically, the label for underwear was designed to be positioned in the center of the small portion of one's back in the hopes that it would not bulge excessively or protrude extensively causing one's outer clothing to look ill fitted. Recently, the problem has become very acute with the introduction of skin-tight designer jeans and slacks for both men and women.

As a result of the above problems, it became necessary to invent an elastic band which is non-overlapping, yet substantially the same thickness throughout the length of the band.

SUMMARY OF THE INVENTION

The present invention is directed toward an elastic band sealer and label assembly. The label assembly employed with the elastic band sealer of the present invention has been previously patented as U.S. Pat. No. 4,012,277. The elastic band sealer of the present invention is designed to make a continuous elastic band for use in such items as sweatbands, jockey straps, underwear, dust covers for beds, or any article in need of an elastic band.

The invention comprises an elastic band sealer including means to feed the elastic from a source of elastic, a means to pull said elastic from said feed means, a means to serrate said elastic into a strip after it is pulled and means to fuse the strip into a continuous non-overlapping band.

A method for making a continuous, non-overlapping band is also provided for. The method includes extending a length of material from a source of material, cutting said material into a strip after the material is extended, and fusing said strip into a continuous non-overlapping band.

These and other characteristics and features of the present invention will come to light by referring to the drawings and detailed specification.

DESCRIPTION OF THE PREFERRED EMBODIMENT

Figure 1:
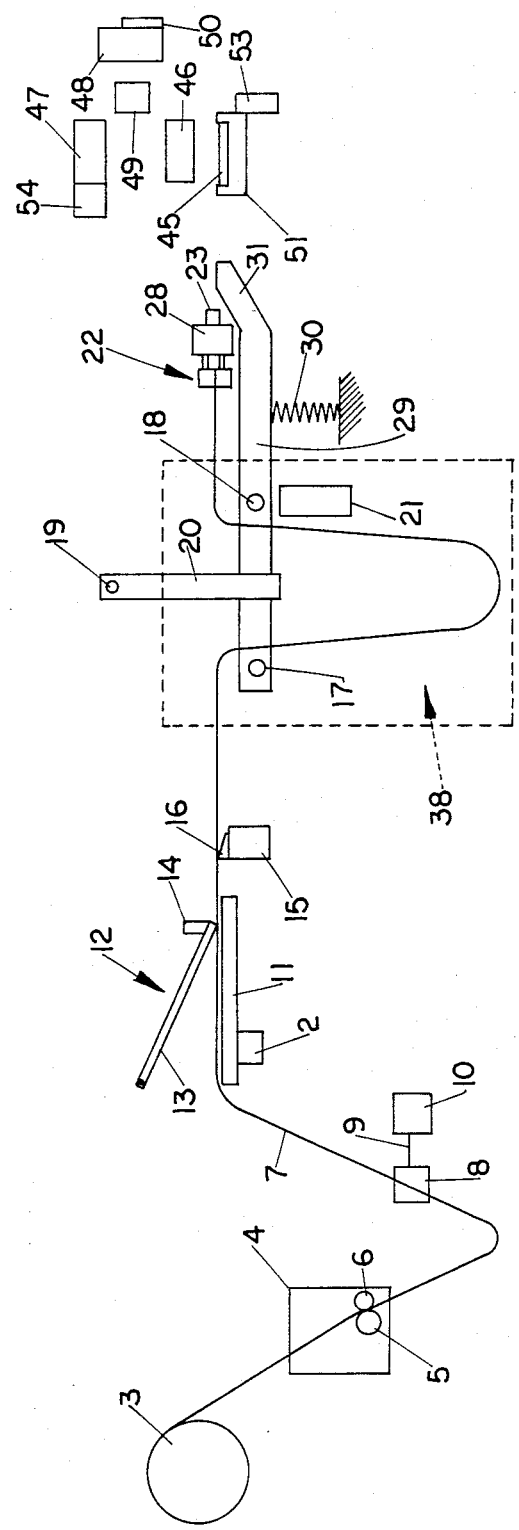
FIG. 1 schematically illustrates a side view of the elastic band sealer and label assembly of the present invention, with the loop and seal support shown in dotted lines, having been removed for clarity.

FIG. 1 schematically illustrates the elastic band sealer and label assembly. The assembly includes a timer 2 which can be a solid state timer, an electro-mechanical timer, or the like well known to those skilled in the art. A source of elastic in roll form is illustrated by reference numeral 3. However, the source of elastic does not require roll form although it is the most prevalent form in the industry. The elastic roll is unwound and fed through a feeder 4, an enclosed loop 8 and placed upon support 11, and held by holding means 12 which prevents the elastic from reversing its path.

Feeder 4 can be any typical type feeder which may contain one or more rotating cylinders. Typically, a pair of rotating cylinders is employed, whereby the elastic is fed between the cylinders. FIG. 1 shows feeder 4 comprising rotating cylinders 5 and 6 which are driven synchronously, in opposite directions, or one of the rotating cylinders can be driven while the other is mounted for free rotation. By frictionally squeezing the elastic 7 between the rollers, the rollers are able to unwind the elastic roll 3. If only one rotating cylinder is employed, the cylinder generally contains means to grip the elastic such that it is incapable of sliding off the cylinder. This means can be, for example, small wire projections extending radially from the surface of the cylinder. The wire projections engage the elastic by projecting and gripping the strip forcing the elastic roll to unwind.

Feeder 4 is controlled by a feeder control switch 10 as is well known in the art. As illustrated in FIG. 1, the feeder control switch comprises an extending arm 9 with an enclosed loop 8 attached thereto. The elastic is inserted through the enclosed loop. Instead of projecting arm 9 having an enclosed loop 8 on one end, a roller could be employed in place of the enclosed loop. The purpose of the feeder control switch is to activate feeder 4 in order to maintain a slack loop between the feeder and support 11 such that elastic 7 assumes a normal, relaxed position. It is important to maintain this normal relaxed position in order to accurately measure the elastic. Feeder control switch 10 can be any type of electro-mechanical switch, known to those in the art, or it can take the form of a more exotic control such as employing pairs of optical eyes capable of activating feeder 4 when the elastic becomes taut and deactivating feeder 4 when the elastic becomes excessively slack. With pairs of optical eyes, it is not necessary to employ elements 8 and 9.

Holding means 12 is positioned above support 11 and prevents the elastic from being pulled backward. As shown in FIG. 1, the preferred holding means 12 is a pointed member 13 with a weight 14 integrally coupled near the end of pointed member 13 which engages the elastic. The pointed member is canted in the direction the elastic is pulled. Consequently, if the elastic reverses its direction, the pointed member engages the elastic preventing backward movement toward elastic roll 3. Holding means 12 can likewise be a clamp, for example, which is activated to an open position whenever it is desired to pull the elastic 7 beyond support 11.

Cutter control assembly 15 and knife 16 are designed to accurately cut the elastic upon activation by timer 2 as will be more fully explained later. Cutter control assembly 15 and knife 16 can be mounted either above or below the path of the elastic but preferably below the elastic. The cutter control assembly 15 includes any device capable of producing a reciprocating movement permitting the knife to engage and cut the elastic. The reciprocating device could be, for example, a solenoid, a pneumatic or hydraulic piston, or the like as is well known to those skilled in the art. Generally, the cutter control assembly will include means to control the force of the reciprocating means necessary for the knife to cut the elastic. The knife can be the guillotine type, wherein it slides in a track, or the sword type which is merely caused to reciprocate to and through the elastic. More exotic types of cutting devices could also be employed such as a laser cutting tool. If a knife is employed, the edge can be serrated or smooth as is well known to those skilled in the art.

Pull clamp 22 is activated by control means 23 which is in turn activated by timer 2 as will be further explained later. Control means 23 causes pull clamp 22 to move from its normal stationary position shown in FIG. 1, to a position immediately above the knife, if the knife is below the elastic, or to a position immediately below the knife edge if the knife assembly is above the elastic. The pull clamp, when positioned above or below the knife edge is in its fully opened position and is caused to close on the elastic adjacent said knife edge by control 28. The pull clamp is then reactivated by control 23 and caused to reverse its path back to its normal position shown in FIG. 1.

Loop studs 17 and 18 are integrally mounted upon stud holder 29 which includes an upwardly directed portion 31. The stud holder 29 is generally positioned to one side of pull clamp 22 resulting in loop studs 17 and 18 normally projecting into the path of the pull clamp whenever it is activated to move to a position adjacent the knife edge. The upwardly directed portion 31 is positioned behind and in contact with the rear portion of pull clamp 22 when the pull clamp is in its normal position. Stud holder 29 is maintained in the position shown in FIG. 1 because the rear portion of pull clamp 22 engages the upwardly directed portion 31 thus pivoting the stud holder to a position whereby loop studs 17 and 18 are in the same horizontal plane. However, as soon as the pull clamp 22 is moved to the left toward the knife edge, spring 30 assumes control of the stud holder 29 and pivots it downwardly thus removing loop studs 17 and 18 from the path of pull clamp 22. Although the stud holder and loop studs 17 and 18 are displaced by mechanical operation, it would be well within the scope of the present invention to remove the stud holder and corresponding loop studs from the path of the pull clamp 22 by electro-mechanical means such as an electric motor, or by such means as a pneumatic or hydraulic cylinder or other types of prime movers as is well known to those skilled in the art.

It should be noted that when pull clamp 22 grasps the elastic adjacent the knife edge and pulls it toward the right in a fully retracted position as shown in FIG. 1, stud loops 17 and 18 are brought into a position immediately below the elastic. Consequently, stud loops 17 and 18 function to partially support the elastic when it is pulled from support 11 to the normal position of pull clamp 22. At this point, the elastic is in a substantially horizontal plane.

Reciprocating measuring stud 19 with component 20 is controlled by measure control means 21 which is in turn activated by timer 2, as will be fully explained later. Measure control means 21 includes a reciprocating element designed to move both the reciprocating measuring stud 19 and component 20 vertically downward from the position shown in FIG. 1, such that reciprocating measuring stud 19 engages elastic 7 and forms a loop between loop studs 17 and 18 as is illustrated in FIG. 1. Measure control means 21 also includes means to control the precise length of the loop of the elastic such that various size elastic bands can be measured accurately by the reciprocating measuring stud 19 and component 20. Measure control means 21 can be set to form an elastic band approximately 4 inches to 60 inches or greater in circumference, when the elastic band is in its relaxed position.

Instead of employing reciprocating measuring stud 19, component 20 and measure control means 21, any type of measuring device could be employed such as, for example, a device which would be integral with clamp 22 and control means 23 such that pull clamp 22 would be retracted to a distance desired for the circumference of the elastic band. While such a system may be adequate for small size elastic bands, large size bands require control means 23 to be capable of retracting pull clamp 22 to great distances. With the present system, the pull clamp can be retracted to the same position every time, thus permitting uniform control, and yet permitting large size bands to be measured by measuring elements 19, 20 and 21, which are designed to function in a plane substantially perpendicular to the operational plane of pull clamp 22. Consequently, the present device can function in less space than that required for the modified device.

Figure 2:
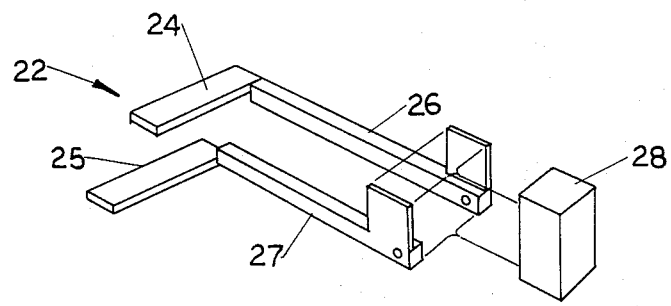
FIG. 2 schematically illustrates an exploded perspective view of the pull clamp shown in FIG. 1.
Figure 3:
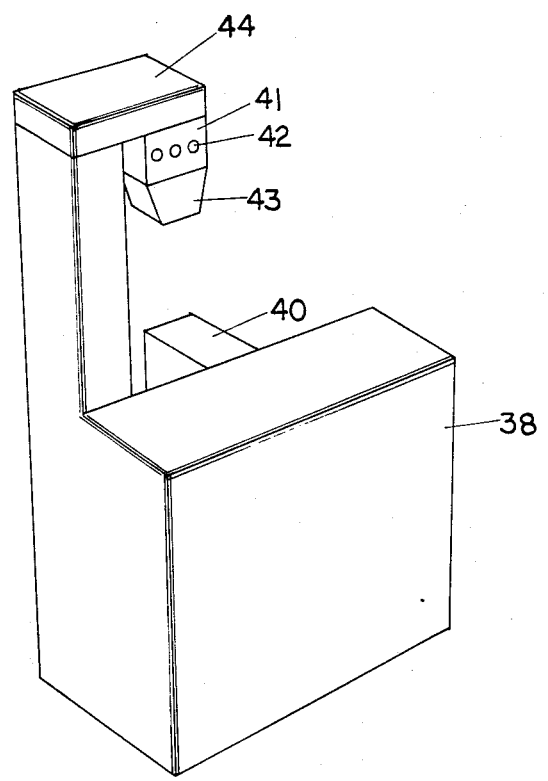
FIG. 3 schematically illustrates an exploded perspective view of the heating head and loop and seal support.

As shown in FIG. 2, pull clamp 22 is controlled by control means 28 which is in turn activated by timer 2 as will be fully explained later. Control means 28 functions to open and close pull clamp 22, comprised of arms 26 and 27 extending from control 28 with clamp bars 24 and 25 on their respective ends which clamp the elastic 7. When it is desired to grasp the elastic 7, control 28, which is activated by timer 2, opens clamp bars 24 and 25 whenever control means 23 has moved pull clamp 22 into a position adjacent the knife edge such that the elastic extends between clamp bars 24 and 25.

Loop and seal support 38 supports controls 36 and 37 from which members 34 and 35 extend. On the end of members 34 and 35 are loop and seal clamps 32 and 33, each including clamp bars similar to 24 and 25. Loop and seal support 38 is controlled by control means 39, but members 34 and 35 including loop and seal clamps 32 and 33 are operated by controls 36 and 37, wherein controls 36, 37 and 39 are activated by timer 2, as will be fully explained later.

Because controls 36 and 37 operate their corresponding members 34 and 35 including their respective loop and seal clamps 32 and 33 in a like manner, only the operation of control 36 will be described. Control 36 can extend and retract member 34 to a position toward and away from the substantially horizontal path of pull clamp 22. Consequently, loop and seal clamp 32 is likewise reciprocated from a position within the path of pull clamp 22, to a position outside the path of pull clamp 22, and vice versa. Control 36 also engages loop and seal clamp 32 causing it to open or close when desired. Lastly, control 36 is capable of rotating member 34 including loop and seal clamp 32 in a clockwise fashion 180°. Control 37 differs in this aspect in that it rotates member 35 including loop and seal clamps 33 in a counterclockwise fashion 180°. In summary, controls 36 and 37 can open and close clamps 32 and 33, extend and retract member 34 and 35, and rotate members 34 and 35.

Loop and seal support 38 includes an upwardly extending member which supports control 44 and heating head 41. Support pad 40 is supported by the lower base portion of loop and seal support 38. Heating head 41 includes at least one orifice 42 which extends entirely through the heating head for keeping the upper portion of the heating head cool while the lower tapered portion 43 is maintained at the temperature desired. Control 44 when activated by timer 2, as will be fully explained later, is capable of reciprocating heating head 41 in a vertical manner until tapered portion 43 is juxtaposed the upper surface of stationary pad 40 but does not contact it. Control 44 is capable of applying up to 40 pounds per square inch to heating head 41, if necessary. Control 44 can include a thermostat regulator permitting an operator to set the temperature of the heating head as desired. The thermostat could also be mounted on a different portion of the elastic band sealer as well. As is well known to those skilled in the art, heating head 41 does not have to include tapered portion 43, nor orifices 42. Heating head 41 can be designed in any manner desired as long as it functions in the manner described.

Control 39 is capable of horizontally reciprocating the loop and seal support 38 when the control is activated by timer 2, as will be fully explained later. In fact, control 39 is able to position loop and seal support 38 from a position centered on reciprocating measuring stud 19 to a position centered upon labeled band ejector 51. Controls 36 and 37 are capable of extending members 34 and 35 to a position adjacent lower heating element 45 in the same substantially horizontal as pull clamp 22, but behind the path of pull clamp 22, that is, to the right of pull clamp 22, as viewed in FIG. 1.

The label assembly includes elements 45–54 and is activated in part by timer 2, as will be fully explained subsequently. Label hopper 48 is designed to hold a plurality of labels and be capable of dispensing each label separately. Control 50 operates label hopper 48 and insures the ejection of one label at a time. Label transfer member 46 is normally positioned between upper label heating head 47 and lower label heating element 45. Both the heating head 47 and heating element 45 are controlled by means 54, which includes a thermostat or dual thermostats capable of controlling the temperature of the heating head and heating elements. Additionally, control member 54 vertically reciprocates upper label heating head 47 from a position shown in FIG. 1 to a position adjacent lower heating element 45.

Label transfer member 46 is operated by control means 49 which is capable of rotating member 46 from a position between the upper label heating head and lower heating element to a position adjacent label hopper 48. Control 49 can also reciprocate label transfer member 46 in a vertical direction, thus permitting the label transfer member to rotate toward label hopper and reciprocate downwardly by picking up a single label ejected from label hopper 48 by control means 50. Then, label transfer member 46, reciprocates upwardly and rotates back to its normal position between upper label heating head 47 and lower heating element 45. Control 49 can also cause the label transfer member to operate in a vertical plane between the heating head and the heating element such that the label transfer member can move from a position between heating head 47 and heating element 45 to a position immediately adjacent the upper surface of the lower heating element 45. Labeled band ejector 51 is normally positioned adjacent heating element 45 and is connected to control 53 by arm 52. Control 53 is capable of reciprocating label ejector 51 in a horizontal plane away from the lower heating element 45. Control 49, 53 and 54 are all activated by timer 2 as will be explained subsequently.

The thermal labeler, per se, forms no part of this invention but is an integral part of the complete system as a means to attach a label to an elastic band. The thermal labeler is known to those skilled in the art as that disclosed by U.S. Pat. No. 4,012,277.

The elastic is typically made of polyester. However, any material capable of being thermally bonded, such as a thermal plastic, could be employed in the present device. Elastic containing less than 100% polyester has also performed satisfactorily with the present device.

The components of the present invention can be made of metal or plastic. Also, heating head 41 and stationary pad 40 along with upper label heating head 47 and lower label heating element 45 can include a teflon coating such that the elastic bands and labels will not stick to these elements.

The reciprocating controls can be pneumatic or hydraulic cylinders, solenoid or other devices well known to those skilled in the art. The rotating devices can include a motive force such as an electrical motor, a rotating pneumatic motor, or the like also well known to those skilled in the art. Of course, various rack and pinion gearing and mechanical linkage may also be necessary to achieve the desired functions.

Generally, heating head 41 is thermostatically regulated to a temperature of approximately 700° F. Heating head 47 and heating element 45 are typically heated to 450°–500° F. Optionally, heating element 45 can be disengaged such that heat necessary to apply a label emanates only from upper label heating head 47. Of course, these elements must include individual adjustable controls to permit the use of various types of elastic made from different materials which may have different melting temperatures. Also, the elastic band sealer can fuse elastic of different widths. For example, the elastic of the waist portion of a jockey strap is generally of a much larger width than the remainder of the elastic jockey stay. Nevertheless, the present invention can form bands for each of the sizes necessary to form a jockey strap.

The labels can be made of cotton, synthetic man made materials, such as nylon, or blended materials, such as 60% polyester and 40% cotton. If the label is a cotton label, it is primarily attached to the elastic band by melting the elastic band into the fabric mesh of the label. If the label contains a material capable of being melted, such as polyester, then both the elastic band and the label can be fused to one another. However, it is important not to heat the label to a point resulting in the destruction of any printed matter which may appear on the label.

Optionally, the elastic band sealer can include a means to count the number of elastic members formed and a means to sense when the elastic roll is exhausted, or near exhaustion such that a replacement roll can be ready for attachment to the elastic band sealer.

The operation of the present invention is as follows. Once the elastic roll 3 is threaded through the feeder 4, through loop 8 of the feeder control switch mechanism 10 and positioned upon support 11 with holding means 12 preventing the elastic band from retracing its path, the normal operating procedure can begin. Control means 23 is activated by timer 2 which causes pull clamp 22 to proceed from its normal position shown in FIG. 1 to a position adjacent knife edge 16. As it proceeds from its normal position to the knife edge, the rear portion of pull clamp 22 disengages itself from the upwardly directed portion 31 of the stud holder 29, causing spring 30 to rotate the stud holder and corresponding stud loops 17 and 18 downwardly, out of the path of pull clamp 22. Consequently, pull clamp 22 can proceed to the left, as shown in FIG. 1 to a position adjacent knife edge 16. It should be noted, that reciprocating measuring stud 19 is above the path of pull clamp 22 and that component 20 is adjacent the path of pull clamp 22 and thus neither element interferes with the movement of the pull clamp. As the pull clamp traverses towards the knife edge, control 28 which is activated by timer 2, causes clamp bars 24 and 25 to open such that they are fully opened when the pull clamp has reached its fully extended position adjacent knife edge 16. At this point, an edge of the elastic 7 will be between clamp bars 24 and 25. Timer 2 then activates control 28 which directs clamp bars 24 and 25 to close, by moving toward each other until they are in a position adjacent and contacting one another with the elastic therebetween. Timer 2 then activates control means 23 causing it to retract clamp 22 to its normal position.

Upon being fully retracted, the rear portion of pull clamp 22 contacts the upwardly directed portion 31 of stud holder 29, causing it to rotate upwardly such that loop studs 17 and 18 are in a position immediately below the elastic which has been pulled in a horizontal plane between support 11 and pull clamp 22.

As soon as pull clamp 22 is in its fully retracted position and the stud holder is in its proper position, timer 2 activates measuring control means 21, which has been previously set at a predetermined distance, which causes component 20 and reciprocating measuring stud 19 to reciprocate in a vertical plane, in a downward direction, until the preset distance has been achieved. Then, the measuring control means reverses the drive mechanism for the reciprocating measuring stud 19 and component 20 causing them to return to their normal position as shown in FIG. 1. At this point, a loop has been formed with the elastic between the loop studs 17 and 18.

As soon as the reciprocating measuring stud returns to its normal position, timer 2 activates the controls 36 and 37 causing them to extend members 34 and 35 from a position adjacent loop and seal support 38 to a position in the path of the elastic. Member 34 when extended, is positioned between knife edge 16 and loop stud 17, while member 35, when extended is positioned between loop stud 18 and pull clamp 22. Also, both controls 36 and 37 cause loop and seal clamps 32 and 33 to open as members 34 and 35 are being extended such that when they are fully extended, the elastic is between the upper and lower portion of the loop and seal clamp 32 and 33. By the time members 34 and 35 are fully extended the loop and seal clamps 32 and 33 are wide open. Timer 2 then activates controls 36 and 37 which close loop and seal clamps 32 and 33 thus clamping the elastic between each clamp. As soon as the loop and seal clamps have fully clamped the elastic, timer 2 simultaneously activates control 28 causing it to open pull clamp 22 releasing the elastic, and causing cutter control assembly 15 to reciprocate knife edge 16 such that it cuts and separates the elastic. Now the elastic is held solely by loop and seal clamps 32 and 33.

As soon as the knife has severed the elastic band and pull clamp 22 has been fully opened, timer 2 activates controls 36 and 37 which retract members 34 and 35, thus removing the elastic from the path of pull clamp 22. When members 34 and 35 have been fully retracted, timer 2 activates control 23 and control 28 causing pull clamp 22 to proceed once again toward knife edge 16 to pull another length of elastic as was described previously.

When controls 36 and 37 have fully retracted members 34 and 35, the members are rotated so that the ends of the elastic member are directed toward one another. This is accomplished by control 36 rotating member 34 in a clockwise fashion while control 37 rotates member 35 in a counterclockwise fashion. It will be observed that when members 34 and 35 are in their fully retracted position, stationary pad 40 is positioned between members 34 and 35. Consequently, when members 34 and 35 are rotated such that the ends of the elastic band are directed toward one another, they fall upon stationary pad 40. As controls 36 and 37 rotate the ends of the elastic member toward one another, timer 2 activates control 44 causing heating head 41 to reciprocate in a vertical plane downardly toward stationary pad 40, until it is in a position above and adjacent the stationary pad and in contact with each end of the elastic strip. Tapered portion 43 of heating head 41 heats and fuses the ends of the elastic together such that a continuous loop is formed. If the ends of the elastic sightly overlap one another, control member 44 subjects heating head 41 to sufficient pressure such that it squeezes each end of the elastic away from one another, due to its tapered design, until the ends are only adjacent one another at which point they are fused together. It may be worth noting, that the heating head does not come into contact with the stationary pad 40. Consequently, this prevents tapered portion 43 from separating the ends of the elastic beyond a distance necessary to fuse the two ends together. Likewise, if the elastic ends are slightly apart, the tapered heating head encourages the ends to seek the lowest point, by gravity, causing the two ends to abut one another prior to being fused together by heating head 41. Accordingly, the elastic band sealer of the present invention always produces a perfect continuous elastic band, with no overlapped ends, thus forming a smooth continuous inner and outer surface for the band.

Figure 4:
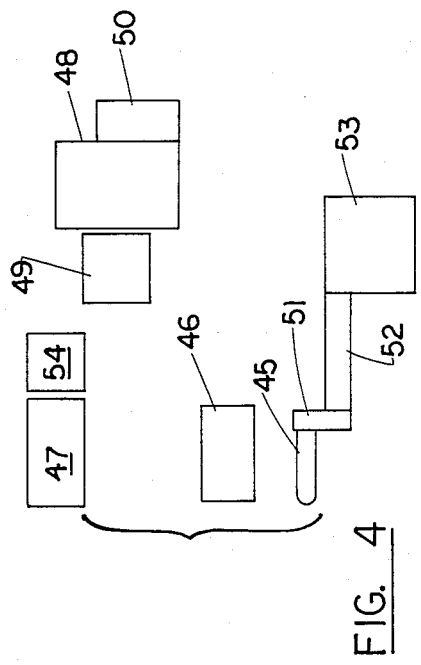
FIG. 4 schematically illustrates an end view of the label assembly illustrated in FIG. 1.
Figure 5:
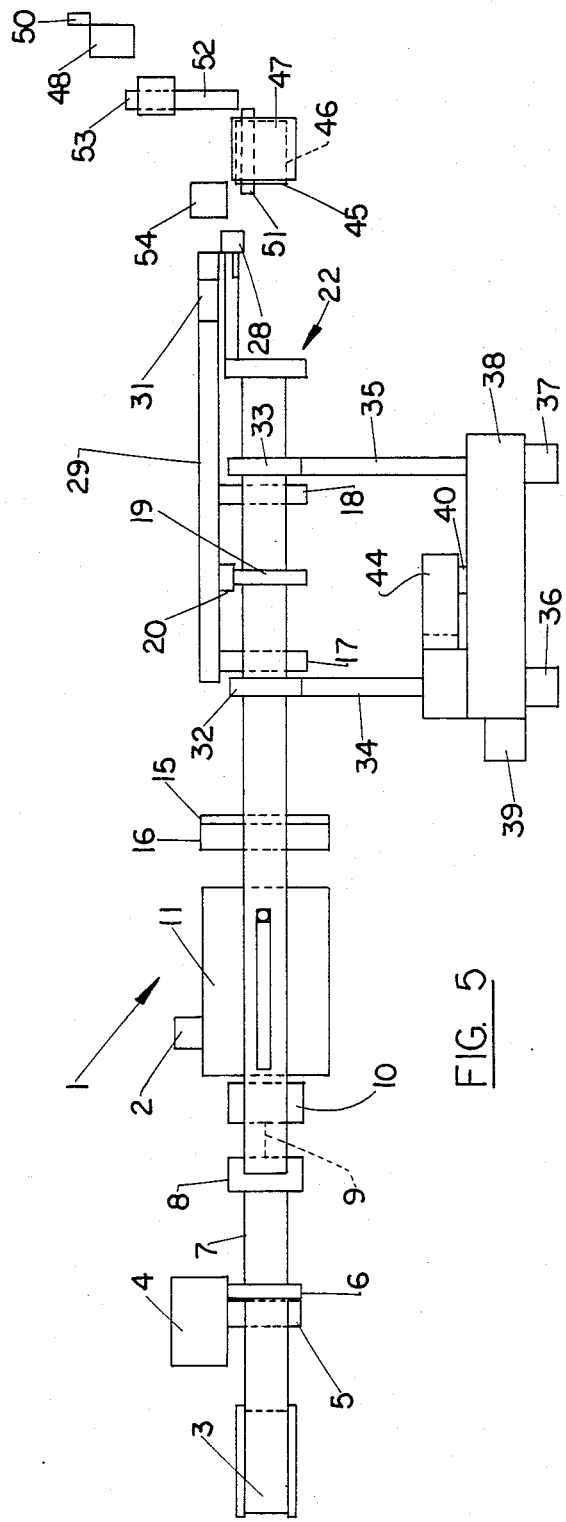
FIG. 5 schematically illustrates a plan view of the apparatus shown in FIG. 1.

When members 34 and 35 were fully retracted, timer 2 also engaged control 39 causing it to horizontally move loop and seal support 38, which includes heating head 41, and stationary pad 40. The loop and seal support 38 is moved from a position centered on reciprocating measuring stud 19 to a position centered on labelled band ejector 51. By the time control 39 has positioned loop and seal support 38 in front of the labelled band ejector 51, heating head 41 has fused the ends of the elastic band into one smooth continuous loop. Note that the elastic band is still held by loop and seal clamps 32 and 33. When control 39 is fully extended thus positioning the loop and seal support 38 adjacent labeled band ejector 51, timer 2 activates controls 36 and 37 causing them to extend members 34 and 35 from a position adjacent the loop and seal support 38 to a fully extended position adjacent either side of the lower heating element 45 and between label transfer member 46 and the lower heating element 45. The elastic band now encircles lower heating element 45. If the elastic band is slightly bowed between loop and seal clamps 32 and 33, the nose portion of lower heating element 45 is rounded, as shown in FIG. 4, thus permitting the bowed portion of the elastic loop to ride upon the lower heating element.

As control 39 was horizontally extending loop and seal support 38 to a position centered upon the labeled band ejector 51, timer 2 activated control 49 which caused label transfer member 46 to rotate out of the plane between the upper label heating head 47 and lower heating element 45 to a position adjacent label hopper 48. At this point, control means 50 has caused hopper 48 to eject a single label in an area immediately below label transfer member 46. Control member 49 then activates label transfer member 46 in a vertically downward direction until the label transfer member comes in contact with the label and picks it up by vacuum force. The label transfer member then rises vertically and rotates back to its normal position between upper label heating head 47 and lower heating element 45, arriving there simultaneously with the arrival of the elastic band from loop and seal support 38.

Timer 2 then activates controls 36 and 37 causing them to open loop and seal clamps 32 and 33 such that they deposit the continuous loop up on the upper surface of lower heating element 45. Then timer 2 causes control 39 to retract loop and seal support 38 and causes controls 36 and 37 to retract members 34 and 35, while permitting clamps 32 and 33 to remain in the open position. If necessary, clamps 32 and 33 are also rotated into a position capable of clamping the next strip of elastic.

When controls 36 and 37 have retracted members 34 and 35, timer 2 simultaneously activated control 49 causing label transfer member 46 to reciprocate downwardly in a vertical plane interrupting the vacuum source such that the label is transferred from the label transfer member to a position atop the elastic band, where the two ends where fused together. As soon as the label transfer member has released the label, timer 2 activates control 49 causing it to reciprocate upwardly in a vertical plane and rotate from a position between upper label heating head 47 and lower heating element 45 to a position adjacent label hopper 48 in order to pick up the next label. As soon as label transfer member 46 is out of the plane of upper label heating head 47 and lower heating element 45, timer 2 activates control 54 causing it to reciprocate the upper label heating head 47 in a vertically downward manner until it is adjacent and in contact with lower heating element 45 causing the elastic band to fuse to the label.

Once the label is fused to the elastic band, timer 2 activates control 54 causing it to retract upper label heating head 47 to a position as shown in FIG. 1 and simultaneously activates control 53 causing it to reciprocate labeled band ejector 51 from a position adjacent control 53 to a fully retracted position just beyond the far edge of label heating element 45. This action causes the elastic band equipped with the label to be ejected from lower heating element 45 into a box positioned below the fully extended ejector 51. Then, control 53 is activated by timer 2 causing it to retract ejector 51 to its normal position adjacent control 53.

Because the whole operation takes place in 6 seconds or less, timer 2 instructs many of the controls to perform various parts of their operation simultaneously. In fact, timer 2 is designed to activate controls 15, 21, 23, 28, 36, 37, 39, 44, 49, 53 and 54. Some of these controls can be combined. For example, controls 23 and 28 could be combined into one control having the function of both controls 23 and 28.

I claim:

1. An elastic band sealer comprising:
   (a) means to feed elastic from a source of elastic;
   (b) means to pull said elastic from said feed means;
   (c) means to serrate said elastic into a strip after it is pulled said strip having ends; and
   (d) means to fuse said strip into an elastic band including means to rotate said ends toward one another to form a continuous band without any overlapping of said strip.

2. The elastic band sealer of claim 1, wherein said means to fuse said strip includes a heating head capable of partially melting said elastic strip and fusing it into an elastic band.

3. The elastic band sealer of claim 1, wherein said means to pull said elastic includes means to measure said elastic.

4. The elastic band sealer of claim 3; wherein said means to measure said elastic is performed in a plane perpendicular to said means to pull.

5. A band sealer for forming a continuous, non-overlapping band from a source of material comprising:
   (a) means to extend a length of said material from said source;
   (b) means to cut said material into a strip after said material is extended, said strip having ends; and
   (c) means to fuse said strip including means to rotate said ends toward one another into a continuous non-overlapping band.

6. The band sealer of claim 5, wherein said means to extend said material includes means to measure said material after said material is extended.

7. The band sealer of claim 6, wherein said means to extend said material is performed in one plane.

8. The band sealer of claim 7, wherein said means to measure said material is performed in another plane substantially perpendicular to said one plane.

9. The band sealer of claim 5, wherein said means to fuse said strip includes a heating head.

10. A method of forming a continuous non-overlapping band from a source of material comprising:
- (a) extending a length of said material in one plane from said source;
- (b) measuring said material in another plane substantially perpendicular to said one plane;
- (c) cutting said material into a strip after said material is extended; and
- (d) fusing said strip into a continuous non-overlapping band.

11. The method of claim 10, wherein the step of extending said material includes the step of measuring said material after said material is extended.

12. The method of claim 10, wherein the step of fusing said strip is performed by means of a heating head.

13. The method of claim 12, wherein said heating head includes a tapered portion which fuses said strip.

14. The method of claim 10, wherein said strip includes ends, and further including the step of rotating said ends toward one another before fusing said strip.

15. The method of claim 14, wherein the step of rotating said ends is performed immediately before fusing said strip.

16. The method of claim 10, wherein the step of extending a length of said material from said source includes the step of preventing the material from retracting back to said source.

* * * * *